(12) United States Patent
Shmilovich et al.

(10) Patent No.: US 8,632,031 B2
(45) Date of Patent: Jan. 21, 2014

(54) SYSTEMS AND METHODS FOR ATTENUATION OF NOISE AND WAKES PRODUCED BY AIRCRAFT

(75) Inventors: Arvin Shmilovich, Huntington Beach, CA (US); Abdollah Khodadoust, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 215 days.

(21) Appl. No.: 13/178,556

(22) Filed: Jul. 8, 2011

(65) Prior Publication Data

US 2012/0256049 A1    Oct. 11, 2012

Related U.S. Application Data

(60) Provisional application No. 61/474,144, filed on Apr. 11, 2011.

(51) Int. Cl.
*B64C 23/00* (2006.01)

(52) U.S. Cl.
USPC .......................... 244/1 N; 244/204; 244/207

(58) Field of Classification Search
USPC .................. 244/1 N, 199.2–199.4, 207
See application file for complete search history.

(56) References Cited

U.S. PATENT DOCUMENTS

| | | |
|---|---|---|
| 3,692,259 A | 9/1972 | Yuan |
| 5,158,251 A | 10/1992 | Taylor |
| 5,322,222 A | 6/1994 | Lott |
| 5,791,601 A | 8/1998 | Dancila et al. |
| 2006/0060723 A1 | 3/2006 | Greenblatt |
| 2007/0020099 A1 | 1/2007 | Hutcheson et al. |
| 2009/0108125 A1 | 4/2009 | Shmilovich et al. |
| 2009/0173835 A1* | 7/2009 | Shmilovich et al. ....... 244/199.3 |
| 2011/0108672 A1* | 5/2011 | Shmilovich et al. .......... 244/207 |

FOREIGN PATENT DOCUMENTS

| | | |
|---|---|---|
| DE | 1756541 A1 | 4/1970 |
| EP | 1 892 184 B1 | 3/2010 |
| NL | 276804 A | 10/1964 |

OTHER PUBLICATIONS

Margaris et al., Wing Tip Vortex Control Using Synthetic Jets; Department of Mechanical Engineering, University of Bath.
Duraisamy et al., Alfred Gessow Rotorcraft Center; Department of Aerospace Engineering; University of Maryland; 1st Applied Aerodynamics Conference; Jun. 3-26, 2003, Orlando, Florida.
Liu; Numerical Simulations of the Aerodynamic Characteristics of Circulation Controlwing Sections; Thesis, Georgia Institute of Technology; Apr. 2001.
McLean et al; Study of the Application of Separation Control by Unsteady Excitation to Civil Transport Aircraft; NASA / CR-1999-209338, Jun. 1999.
European Search Report and Opinion, Application No. 12160691.7, Aug. 17, 2012.

* cited by examiner

*Primary Examiner* — Timothy D Collins
*Assistant Examiner* — Nicholas McFall
(74) *Attorney, Agent, or Firm* — Ostrager Chong Flaherty & Broitman P.C.

(57) ABSTRACT

Systems and methods for reducing the trailing vortices and lowering the noise produced by the side edges of aircraft flight control surfaces, tips of wings and winglets, and tips of rotor blades. A noise-reducing, wake-alleviating device is disclosed which incorporates an actuator and one or more air-ejecting slot-shaped openings coupled to that actuator and located on the upper and/or lower surfaces and/or the side edges of an aircraft flight control surface or the tip of a wing, winglet or blade. The actuation mechanism produces sets of small and fast-moving air jets that traverse the openings in the general streamwise direction. The actuation destabilizes the flap vortex structure, resulting in reduced intensity of trailing vortices and lower airplane noise.

9 Claims, 4 Drawing Sheets

SYSTEMS AND METHODS FOR ATTENUATION OF NOISE AND WAKES PRODUCED BY AIRCRAFT

RELATED PATENT APPLICATION

This application claims the benefit, under Title 35, United States Code, §119(e), of U.S. Provisional Application No. 61/474,144 filed on Apr. 11, 2011.

BACKGROUND

The embodiments disclosed hereinafter generally relate to systems and methods for reducing the trailing vortices and lowering the noise produced by the side edges of aircraft flight control surfaces or the tips of wings or rotor blades.

Over the years strict noise regulations have led to air traffic inefficiencies and reduced airport productivity. At many airports current capacity is largely controlled by the hours of operations, which are usually confined mostly to daylight hours to limit noise pollution at night. Consequently, noise reduction in airport environments has become an area of high priority in the aerospace transport industry. During takeoff, approach and landing noise is generated by the engines and airframe components. With the advent of high-bypass-ratio engines, significant reduction in engine noise has been achieved in recent years. Consequently, other noise sources have become more critical, with greater focus now being placed on airframe noise reduction. A major component of airframe noise is the high-lift system. In particular, flap elements produce high noise levels because of the tip vortex pattern.

Researchers in Europe as well as NASA have demonstrated substantial reduction in flap noise by using blowing jets at the side edges. The jets alter the vortex pattern, resulting in lower noise. The problem is that this method requires a significant amount of blowing to achieve meaningful noise reduction levels.

Blowing jets can be used to reduce flap noise by using a fluidic source, such as bleed air off an engine or a special-purpose compressor. The engine can be used to supply air for actuation. The requirement of engine bleed impacts the size of the engines. The larger the bleed amount, the heavier the engine, leading to an increase in airplane gross weight. In addition, engine efficiency is degraded due to bleed. Alternatively, a compressor can also be used in conjunction with a duct delivery system, but this also leads to significant additional weight.

Another problem is the vortex wakes of large transports. An area of high priority in the air transport industry is solving the looming problem of airport congestion. The capacity of many airports is close to saturation, yet the number of aircraft in commercial aviation is projected to increase. A factor in regulating landing and takeoff frequency is the time necessary for the dissipation of wake vortices produced by airplanes in motion. There is a pressing need for systems and methods for alleviating vortex wakes produced by airplanes during approaching and landing.

With respect to airplane wake alleviation, one solution is to avoid the flight path of large airplanes. Federal regulations require aircraft separation to be maintained to assure that severe vortex encounters are avoided. The minimum separation distance represents a key limiting factor of productivity at a growing number of airports around the world, with ripple effects on the entire air traffic system, not to mention passenger inconvenience. Airport congestion and delays translate to higher costs for air transportation. The incentive is very strong for finding a solution without compromising flight safety.

Wake alleviation is also a pressing need in the rotorcraft industry. For helicopters, the blade tip vortex passes close to the following blade, which, in certain situations, can lead to strong undesirable blade vortex interactions. The blade vortex interaction is the cause of noise from helicopters. Successful control of blade tip vortices can mitigate noise, enhance maneuverability and reduce operational hazard of helicopters.

SUMMARY

The embodiments disclosed hereinafter generally relate to systems and methods for reducing the trailing vortices and lowering the noise produced by the edges of aircraft flight control surfaces. Although some of the embodiments disclosed herein involve the installation of a noise-reducing, wake-alleviating device within a wing flap element, it should be appreciated that such devices can also be installed in other types of aircraft flight control surfaces, such as within ailerons, thrust deflectors, spoilers and slats mounted on fixed-wing aircraft. Such noise-reducing, wake-alleviating devices can also be installed within the tips of wings or winglets on fixed-wing aircraft and the tips of blades of rotorcraft.

In accordance with one particular embodiment, a noise-reducing, wake-alleviating device is located within an aircraft flight control surface, in particular, a wing flap element. The device is positioned along and near the side edges of the flap element, extending over part of its chord. The device is activated when the high-lift system is deployed during approach and landing. Under these conditions the trailing vortices are the strongest and the flap noise component is predominant.

In one exemplary implementation, the noise-reducing, wake-alleviating device comprises a traversing jet actuator and a corresponding set of air-ejecting slot-shaped openings located on the upper surface, the lower surface and the side edges of the flap. The actuation mechanism produces sets of small and fast-moving air jets which traverse the openings in a streamwise direction. The actuation of this mechanism destabilizes the flap vortex structure, resulting in reduced intensity of trailing vortices and lower airplane noise.

Although the exemplary embodiment disclosed herein has respective openings coupled to a single actuator for ejecting traversing air jets, which openings are respectively located along the upper and lower surfaces of the flap near the side edge and along the side edge itself, it should be appreciated that providing a single air-ejecting opening or two or more such openings coupled to a single actuator is within the scope of the invention.

More generally, one aspect of the invention is an aircraft comprising an aerodynamic element, a source of pressurized air, an air jet actuator and a controller, wherein the aerodynamic element comprises a side edge and an opening located on or near the side edge and generally aligned with a streamwise direction; the air jet actuator comprises a rotatable element, the rotatable element comprising an interior duct and an opening in fluid communication with the interior duct; and the controller is operable to cause the interior duct of the rotatable element to be placed in fluid communication with the pressurized air source and also cause the rotatable element to rotate, as a result of which the interior duct of the rotatable element is in fluid communication with the opening of the aerodynamic element via the opening in the rotatable element, thereby enabling pressurized air from the source to exit the opening of the aerodynamic element in the form of an air jet.

Another aspect of the invention is a method of attenuating noise generated by an aerodynamic element during flight of a vehicle, comprising: (a) forming a slot on or near a side edge of an aerodynamic element having upper and lower surfaces, which slot will be generally aligned with a streamwise direction during flight; and (b) ejecting air out the slot at a multiplicity of locations in succession, the locations being disposed along a length of the slot at a distance from one end of the slot which increases with time.

A further aspect of the invention is an apparatus comprising an aerodynamic element and an air jet actuator, wherein the aerodynamic element comprises a side edge and a slot located on or near the side edge; and the air jet actuator comprises a rotatable element, the rotatable element comprising an interior duct and a slot or a series of slots or apertures arranged along a line that winds around the rotatable element and in fluid communication with the interior duct, wherein the interior duct of the rotatable element is in fluid communication with the slot in the aerodynamic element via the slot(s) or apertures of the rotatable element during rotation of the rotatable element relative to the aerodynamic element.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

An embodiment will now be described with reference to an airplane and a flight control surface thereof respectively depicted in FIGS. 1 and 2. In particular, this embodiment involves the installation of noise-reducing, wake-alleviating devices within wing flap elements. However, it should be appreciated that such noise-reducing, wake-alleviating devices can also be installed in other types of aircraft flight control surfaces, such as within ailerons, thrust deflectors, spoilers and slats mounted on fixed-wing aircraft. Such noise-reducing, wake-alleviating devices can also be installed within the tips of wings or winglets on fixed-wing aircraft and the tips of blades of rotorcraft.

Figure 1:
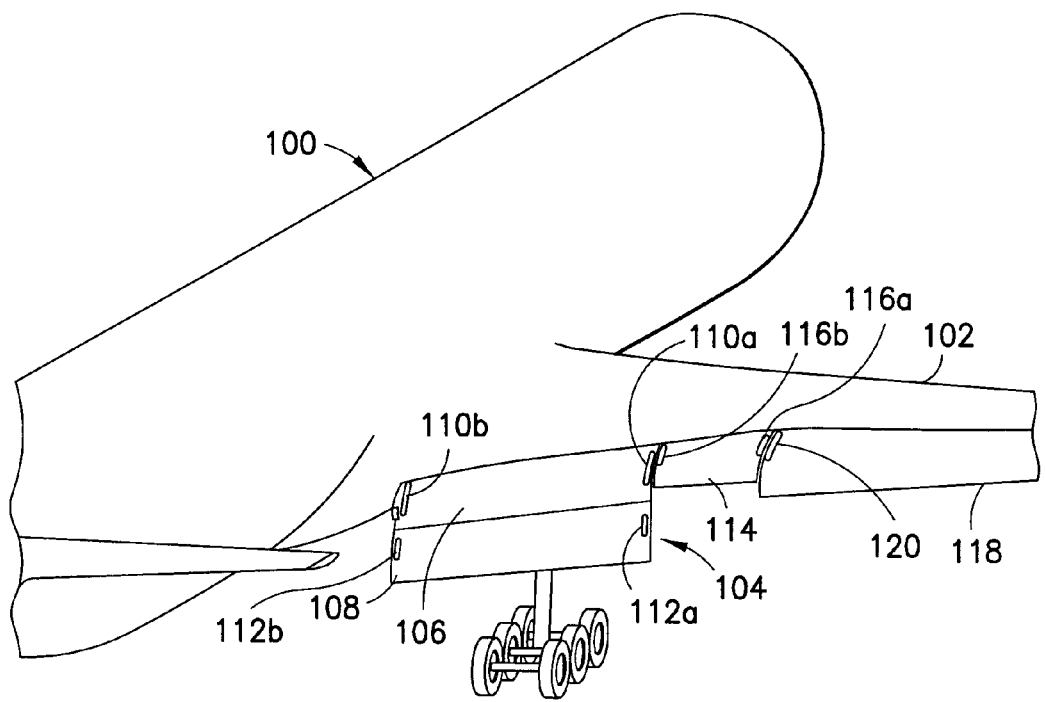
FIG. 1 is a diagram showing an isometric view of an airplane having flight control surfaces with air-ejecting slots along their side edges in accordance with embodiments disclosed herein.

FIG. 1 shows an airplane 100 having a noise alleviation system that is used in conjunction with the high-lift deployment of control surfaces attached to wings 102 (only one wing is visible in FIG. 1). The wing 102 seen in FIG. 1 has the following flap elements coupled to its trailing edge: an inboard flap system 104 comprising a front flap element 106 and a rear flap element 108, a thrust deflector 114, and an outboard flap 118. As the airplane flies, the airstream through which the airplane passes establishes a streamwise direction. In accordance with one embodiment of the invention, the above-listed flap elements have noise-reducing, wake-alleviating devices installed near or on the side edges of these flap elements. The only portions of noise-reducing, wake-alleviating devices which appear in FIG. 1 are: slots 110a and 110b on the upper surface and near the respective side edges of front flap element 106; slots 112a and 112b on the upper surface and near the respective side edges of rear flap element 108; slots 116a and 116b on the upper surface and near the respective side edges of thrust deflector 114; and slot 120 on the upper surface and near the inboard side edge of outboard flap 118.

All of the noise-reducing, wake-alleviating devices installed on the flap elements seen in FIG. 1 may have the same construction and operate on the same principles. The structure and operation of various embodiments of the noise-reducing, wake-alleviating devices associated with slots 110a and 110b on front flap element 106 will now be described with reference to FIGS. 2, 4 and 5. Other noise-reducing, wake-alleviating devices associated with the slots on thrust deflector 114 and outboard flap 118 may have a similar construction and operate in a similar manner.

Figure 2:
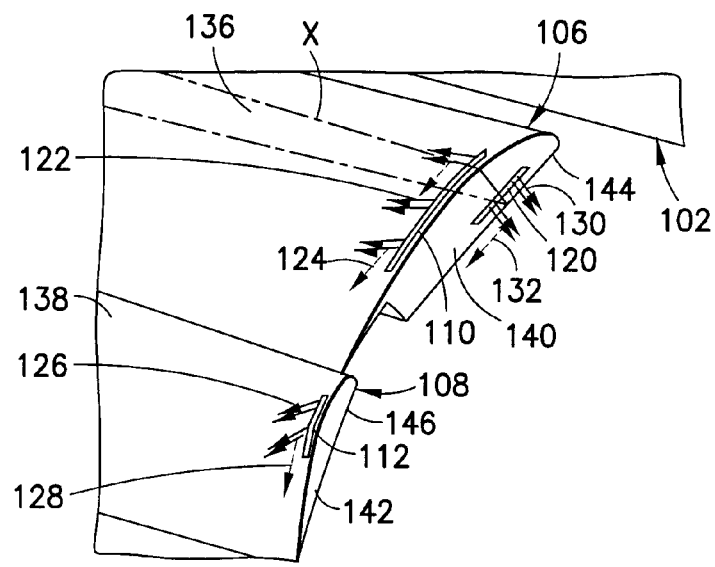
FIG. 2 is a diagram showing an isometric view of a side edge portion of the inboard flap system of the airplane depicted in FIG. 1. The dot-dash lines indicate a plane X that intersects that side edge portion.

FIG. 2 shows an outboard portion (including an outboard side edge) of an inboard flap system of an airplane of the type depicted in FIG. 1. More specifically, FIG. 2 shows an outboard portion (including an outboard side edge 140) of front flap element 106 and an outboard portion (including an outboard side edge 142) of rear flap element 108 of the inboard flap system. Traverse actuators (not visible in FIG. 2 because they are below the surface) are embedded in the flap elements 106 and 108 on or near the flap side edges and generally aligned with the streamwise direction. A multiplicity of flow ejection slots are fluidly coupled to the actuators. In the embodiment shown in FIG. 2, multiple flow ejection slots are coupled to a single actuator. However, a single actuator could be linked to only one flap slot. The flow ejection slots are flush with the flap element mold lines and may be constructed on the upper and lower surfaces, as well as on the side edges of the flap elements. However, in other embodiments, a single actuator could be linked to only one flap slot.

As seen in FIG. 2, forward flap element 106 has a flow ejection slot 110 on its upper surface 136 and a flow ejection slot 120 on its outboard side edge 140; and rear flap element 108 has a flow ejection slot 112 on its upper surface 138. Optionally, further flow ejection slots (not shown in FIG. 2) may be constructed on the lower surfaces of front and rear flap elements 106 and 108, near the respective flap side edges 140 and 142 and generally aligned with the streamwise direction. Optionally, another flow ejection slot may be constructed on the side edge 142 of rear flap element 108. Similarly, rotor blade tips, airplane wing or winglet tips and side edges of flight control surfaces other than flaps may be provided with one, two or three flow ejection slots to attenuate attendant noise and wake vortices.

In FIG. 2, each air jet is represented by a pair of closely spaced and mutually parallel arrows. To avoid clutter in the drawing, three air jets 122 are shown exiting flap slot 110 on the upper surface 136 of front flap element 106; two air jets 130 are shown exiting flap slot 120 on the side edge 140 of front flap element 106; and two air jets 126 are shown exiting flap slot 112 on the upper surface 138 of rear flap element 108. However, the actuator unit disclosed hereinafter is capable of producing any number of spaced air jets along the length of a slot. Thus the invention is not limited to any particular number of air jets concurrently flowing out of the slot.

In accordance with the scenario depicted in FIG. 2, the air jets 122 exiting slot 110 move in a streamwise direction, as indicated by dashed arrow 124. The air jets 122 traverse a given length of slot 110 concurrently at a rate which may remain constant during each traverse (e.g., for a helical slot of constant pitch) or which may change during the traverse (e.g., for a helical slot having a varying pitch). For the embodiment depicted in FIG. 2, each air jet 122 is initiated at or near the front end of slot 110, then traverses slot 110 in the streamwise direction, and finally is extinguished when it reaches or nearly reaches the rear end of slot 110.

The air jets 126 exiting slot 112 on the upper surface 138 of rear flap element 108 behave in a similar way, wherein each air jet 126 is initiated at or near the front end of slot 112, then traverses slot 112 in a streamwise direction (as indicated by dashed arrow 128 in FIG. 2), and finally is extinguished when it reaches or nearly reaches the rear end of slot 112.

Likewise each air jet 130 exiting slot 120 on the side edge 140 of front flap element 106 is initiated at or near the front end of slot 120, then traverses slot 120 in a streamwise direction (as indicated by dashed arrow 132 in FIG. 2), and finally is extinguished when it reaches or nearly reaches the rear end of slot 120.

Although arrows 124, 128 and 132 in FIG. 2 show all air jets traversing the various slots in a streamwise direction, the traverse actuators disclosed herein can be designed to cause the air jets to traverse the flap slots in the forward direction. Traverse actuators capable of generating effective traversing air jets in either direction are fully described in U.S. Patent Application Pub. No. 2011/0108672.

When the system shown in FIG. 2 is activated during approach and landing, air in the form of discrete jets is ejected through each of the flap slots. These jets move continuously in a streamwise direction. Generally, blowing jets can significantly alter the tip flow structure and thereby reduce noise. The disclosed system provides an array of very small jets, which move rapidly in a streamwise direction. The momentum imparted to the flow effectively introduces continuous perturbations that impact the vortex structure and the ensuing noise generation. By using the traverse actuation, the vortex and noise suppression mechanism is obtained with only a fraction of the input required by a constant blowing system.

Figure 4:
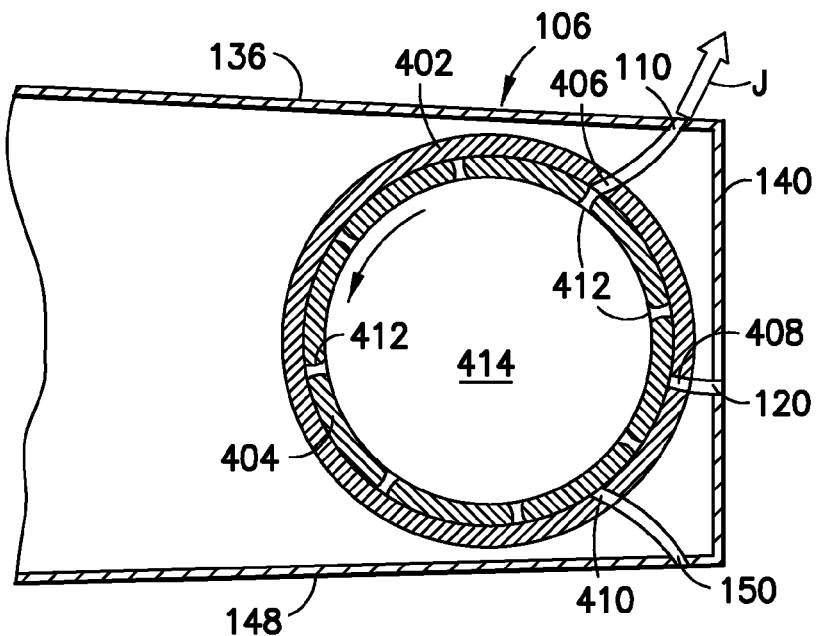
FIG. 4 is a diagram showing a cross-sectional view of the side edge of the front element of the inboard flap system depicted in FIG. 2, the cross section being taken along plane X indicated in FIG. 2.

A brief description, highlighting aspects of implementations according to various embodiments, will now be provided with reference to FIG. 4, which is a cross-sectional view of the side edge of the front element of the inboard flap system depicted in FIG. 2, the cross section being taken along plane X indicated in FIG. 2. An actuator structure will now be described which would produce eight air jets exiting each of slots 110, 120, 150 at any given moment in time. It should be borne in mind, however, that the invention is not limited to the production of any particular number of concurrent jets.

As seen in FIG. 4, the actuator in accordance with one embodiment comprises an outer cylindrical element 402 and an inner cylindrical element 404 which is arranged inside outer cylindrical element 402, concentric therewith. Both cylindrical elements have circular cross sections. Inner cylindrical element 404 defines an interior duct 414 and a number of helical slots 412 which are in fluid communication with the interior duct 414. In the particular implementation shown in FIG. 4, there are eight helical slots 412 spaced at equal angles (45°) around the circumference of the inner cylindrical element 404. Each helical slot extends from near one end to near the other end of the inner cylindrical element.

In the disclosed embodiments, the helical slots follow a helical line of constant or varying pitch. For example, in the case where pitch is constant along the slot length, the slot would appear straight if the inner cylindrical element were unwrapped and laid flat. In contrast, in the case where pitch varies abruptly along the slot length, the slot would as a series of straight segments, connected end to end, if the inner cylindrical element were unwrapped and laid flat. In the case where pitch varies continuously along the slot length, the slot would be curved if the inner cylindrical element were unwrapped and laid flat.

Returning to FIG. 4, inner cylindrical element 404 is rotatably disposed within outer cylindrical element 402. The latter, in turn, is fixedly installed or mounted inside a side edge portion of front flap element 106. In the particular implementation shown in FIG. 4, the front flap element 106 incorporates three slots 110, 120, 150 and the outer cylindrical element 402 incorporates three slots 406, 408, 410 respectively aligned with and in direct fluid communication with slots 110, 120, 150. (Slots 110 and 120 were previously depicted in FIG. 2.) In one implementation, slots 110, 120, 150, 406, 408, 410 comprise narrow rectangular openings. The exit end of slot 110 terminates at an upper surface 136 of the skin of front flap element 106 and the entry end terminates at slot 406 formed in outer cylindrical element 402; the exit end of slot 120 terminates at side edge 140 of the skin of front flap element 106 and the entry end terminates at slot 408 formed in outer cylindrical element 402; and the exit end of slot 150 terminates at lower surface 148 of the skin of front flap element 106 and the entry end terminates at slot 410 formed in outer cylindrical element 402. The skin of front flap element 106 could be aluminum (conventional), composites or other material (e.g., a new aluminum-based material which could be as strong and as light as composite material). In some applications (mostly military), there are segments of flaps which are made of titanium (for protection from hot plumes off engines).

As a result of the arrangement shown in FIG. 4 (i.e., having eight helical slots), eight spaced air jets will concurrently exit each of flap slots 110, 120, 150 during rotation of inner cylindrical element 404 inside outer cylindrical element 402. The position of each air jet is determined by which portions of the eight helical slots 412 confront opposing portions of slots 406, 408, 410 formed in the outer cylindrical element 402. In other implementations, the number of helical slots formed in the inner cylindrical element can be different than eight, e.g., one through seven. Alternatively, the number of helical slots could be greater than eight.

FIG. 4 displays a cross-sectional cut through the front flap element 106 at the instant when one of the helical slots 412 overlaps the slot 110 connected to the upper surface 136 of front flap element 106. This is the moment when the jet (indicated by arrow J in FIG. 4) moving along slot 110 passes through this particular cross section.

In accordance with various embodiments disclosed herein, the inner cylinder 404 is a rotating element whose rotational speed is controlled by an electrical motor. The inner cylindrical element 404 can have one or more helical slots whose width is approximately equal to the width of the slots formed in the outer cylinder 402 and the flap slots. High-pressure air is supplied to one end of the interior duct 414 formed by inner cylinder 404. As the inner cylinder 404 rotates, a finite opening is formed at the streamwise station where the helical slot momentarily overlaps the slot of the outer stationary cylinder 402, thereby forcing air through and ejecting air out of the corresponding flap slot and into the external flow. The continuous rotation of the inner cylinder 404 effectively produces an air jet that traverses the flap slot, e.g., from one end to the other end. In an implementation having eight helical slots, each helical slot consisting of one turn, eight air jets can be produced. The same effect can be achieved by providing four helical slots, each helical slot consisting of two turns; or two helical slots, each helical slot consisting of four turns, and so forth. Alternatively, the number of air jets exiting a flap slot can be different than eight. For example, an inner cylinder having four helical slots, each helical slot consisting of one turn, would concurrently produce four air jets. The same effect can be achieved by providing two helical slots, each helical slot consisting of two turns, and so forth.

Each slot in an aerodynamic element may be linked to a single actuator. However, optional installations might also be considered. For example, each slot could be linked to a set of in-line actuation units.

Figure 5:
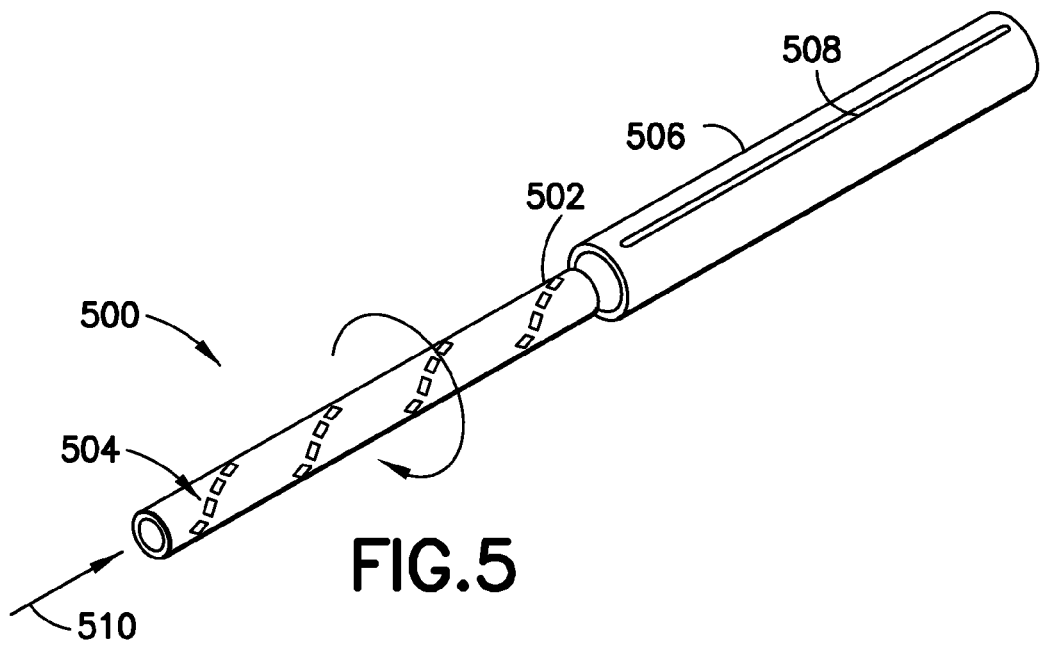
FIG. 5 is a diagram showing an isometric exploded view of two components of an air jet actuator in accordance with an alternative embodiment.

FIG. 5 shows components of an actuator assembly 500 in accordance with an alternative embodiment. Actuator assembly 500 comprises an inner cylindrical element 502 and an outer cylindrical element 506, the former being shown disassembled from the latter. Arrow 510 in FIG. 5 indicates that inner cylindrical element 502 can be slid into outer cylindrical element 506 during assembly. When inserted, inner cylindrical element 502 is rotatable relative to outer cylindrical element 506. The latter is fixedly installed or mounted in an aerodynamic element, such as the flap elements seen in FIG. 2. The outer cylindrical element 506 comprises a straight longitudinal slot 508, which will be in fluid communication and coextensive with a corresponding flap slot (not shown in FIG. 5).

The inner cylindrical element depicted in FIG. 5 differs from that depicted in FIG. 4 in that inner cylindrical element 502 has a multiplicity of spaced slots arranged along a single helical lines that has four turns, whereas the embodiment shown in FIG. 4 has eight helical slots, each comprising a single turn. In the particular implementation shown in FIG. 5, there is one set 504 of spaced slots that follow a single helical line having four turns. In other implementations, the number of sets of spaced slots formed in the inner cylindrical element can be different than one. For example, analogous to the embodiment shown in FIG. 4, eight sets of spaced slots, each set following a respective helical line having one turn, could be formed in the inner cylindrical element. Alternatively, there could be four sets of spaced slots, each set following a respective helical line having two turns, and so forth. Moreover, consistent with the earlier discussions of helical slots having varying pitch, the helical lines along which sets of spaced slots are arranged could have a pitch that varies.

A single helical slot in the inner cylindrical element 404 (seen in FIG. 4) is capable of producing (in conjunction with a straight longitudinal slot of the outer cylindrical element 402) an air jet that traverses a corresponding straight longitudinal slot formed in front flap element 106 from near one end to near the other end, being extinguished only when the air jet has reached or nearly reached the opposite end of the slot from where the air jet was initiated. In contrast, a single set of spaced slots (e.g., set 504 seen in FIG. 5) in the inner cylindrical element 502 would not produce jets that continuously traverse the flap slot. Instead, each slot of each set would produce a respective air jet each time that slot overlaps with slot 508 formed in outer cylindrical element 506. For example, if the set of spaced slots seen in FIG. 5 were symmetrically arranged around the circumference of inner cylindrical element 502 and if the slots within set 504 were equally spaced from each other, then during rotation of inner cylindrical element 502 while pressurized air is being supplied to its interior duct, respective sets of four air jets would be ejected intermittently from the corresponding flap slot (because the set of slots winds around the inner cylindrical element four times). The air jets of each set would be quickly extinguished as a result of further rotation of the inner cylindrical element and then a new set of air jets would be ejected. This pattern would continue, with the difference that a first set of four air jets exiting the flap slot at one instant in time and then a second set of four air jets would exit the flap slot at a later instant in time, all of the air jets of the second set being displaced by the same incremental distance from the respective locations where the first set of air jets had been produced (if the pitch of the helical line followed by the spaced slots were constant). In this manner, successive sets of air jets would appear intermittently and be displaced incrementally across the length of the flap slot.

In accordance with further variations, instead of sets of spaced slots, the inner cylindrical element could be formed with sets of spaced apertures having shapes different than slots, e.g., circular apertures.

In accordance with the embodiments described with reference to FIGS. 2 and 4, the aerodynamic element is a flap coupled to the wing of an aircraft. There are several different types of flaps, such as a Krueger flap, plain flap, split flap, Fowler flap, slotted flap, simple hinge flap and/or any other suitable type of flap. However, the noise-reducing wake-alleviating devices disclosed herein are not limited in application to flaps, but may also be installed in ailerons, thrust deflectors, spoilers, air brakes and slats mounted on fixed-wing aircraft, in the tips of wings or winglets on fixed-wing aircraft, and in the tips of blades of rotorcraft. The architecture of noise-reducing, wake-alleviating devices having broad application will now be described with reference to FIG. 3.

Figure 3:
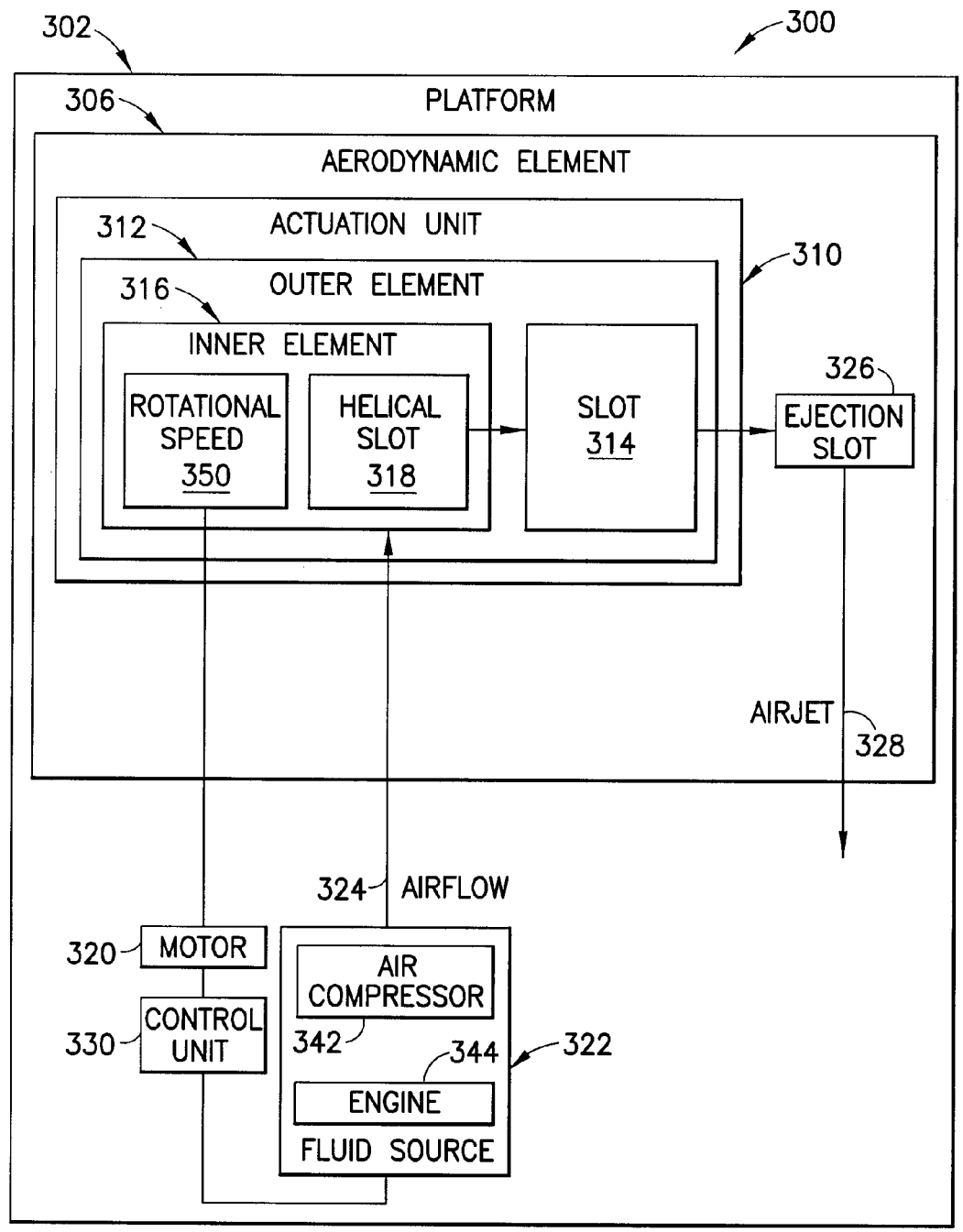
FIG. 3 is a block diagram showing components of a system that is incorporated in a platform capable of flight (e.g., an airplane or rotorcraft), the system itself being capable of alleviating noise and vibration produced by a side edge of an aerodynamic element.

FIG. 3 generally depicts an apparatus 300 for reducing the noise produced by edges of an aerodynamic element 306 of a platform 302 (e.g., an airplane or a helicopter), which general depiction encompasses the embodiments already disclosed herein. Aerodynamic element 306 can be a flight control surface, a wing or winglet tip or a blade tip, as previously described. The aerodynamic element 306 has an ejection slot 326 which preferably is a straight longitudinal opening.

As seen in FIG. 3, aerodynamic element 306 incorporates an actuation unit 310. Actuation unit 310 comprises an outer element 312 and an inner element 316. In the example depicted in FIG. 3, outer element 312 and inner element 316 may be concentric hollow cylinders of the type previously disclosed, the latter being rotatably installed inside the former. The outer element 312 has a slot 314. Outer element 312 is positioned in aerodynamic element 306 such that ejection slot 326 and slot 314 are in fluid communication. Preferably slots 314 and 326 have similar shapes (e.g., rectangles) and dimensions.

In contrast, the inner element 316 has a helical slot 318 which allows fluid communication between the interior and exterior of the inner element. In one illustrative example, the helical slot 318 is formed such that a number of portions of helical slot 318 and slot 314 overlap at each angular position of the inner element. Each time respective portions of helical slot 318 and slot 314 intersect, they create respective areas of overlap. Depending upon how tightly helical slot 318 may wind around the axis of inner element 316, multiple portions of helical slot 318 and slot 314 may overlap or be in direct fluid communication at any given time, thereby producing a multiplicity of spaced air jets which exit the ejection slot 326 concurrently.

Inner element 316 and outer element 312 may be composed of various different materials. For example, without limitation, inner element 316 and outer element 312 may be made of aluminum, steel, titanium, composite material, and/or any other suitable material.

As seen in FIG. 3, a motor 320 is coupled to the inner element 316. Motor 320 supplies a force to inner element 316 to cause inner element 316 to rotate around its axis. A control unit 330 is connected to motor 320. The control unit 330 can regulate a rotational speed 350 of the inner element 316 in a well-known manner. For example, without limitation, motor 320 may be an electrical motor, a hydraulic motor, a pneumatic motor, or any other suitable type of motor.

The apparatus shown in FIG. 3 further comprises a fluid source 322, which supplies an airflow 324 into the interior of inner element 316. Airflow 324 is a stream of pressurized air. Airflow 324 may have a pressure greater than a relative external air pressure for a given altitude of the platform 302. The pressure difference between airflow 324 and the external flow determines the velocity of each air jet 328 that exits the ejection slot 326. Control unit 330 is connected to fluid source 322. Control unit 330 can regulate a speed and pressure of airflow 324 in a well-known manner. Fluid source 322 may be a separate device included in platform 302, such as an air compressor 342. Alternatively, fluid source 322 may be an engine 344 of platform 302. Platform 302 may be configured to bleed compressed air from engine 344 to supply airflow 324. If aerodynamic element 306 were a tip of a rotor blade of a helicopter, then the helicopter would carry a dedicated compressor or an auxiliary power unit, which would be connected to the inner element 316 by a duct system.

The airflow 324 enters the interior of inner element 316 and then flows outwardly through helical slot 318 of inner element 316, through slot 314 of outer element 312, and then out ejection slot 326 of aerodynamic element 306. As airflow 324 flows out ejection slot 326, it exits aerodynamic element 306 to form one or more jets of air, such as air jet 328. In the case where the inner element 316 has a single helical slot 318, then the number of air jets produced is a function of the number of turns of that helical slot, as previously described. Also, inner element 316 can have multiple helical slots, as previously described.

More specifically, as inner element 316 rotates, an opening is formed at a number of portions where helical slot 318 momentarily overlaps with slot 314. Airflow 324 flows from inside the inner element 316, through aligned slots 318, 314 and 326, and into an external airflow field. The continuous rotation of inner element 316, in conjunction with the higher pressure of airflow 324, produces one or more air jets such as air jet 328 which flow in a direction substantially perpendicular to the axis of inner element 316. As inner element 316 continues to rotate, the rotation of inner element 316 causes each air jet 328 to travel in a direction parallel to the axis of inner element 316. Each air jet starts from one end of the ejection slot 326 and travels to the other end of the ejection slot, where the air jet is extinguished. If the number of turns of the helical slot is greater than or equal to two, then a plurality of spaced air jets will be ejected concurrently and will continually move at the same speed. The helical slot 318 of the inner element 316 can be configured such that each time an air jet is extinguished at one end of the ejection slot 326, a new air jet is produced at the other end of the ejection slot. Each air jet 328 moves along or traverses the ejection slot 326.

The length of air jet 328 is determined by the length of the overlap of helical slot 318 with slot 314. The width of air jet 328 is determined by the width of slot 314. The speed with which air jet 328 traverses aerodynamic element 306 is determined by the rotational speed 350 of inner element 316 and by the angle or pitch of the helical slot 318.

The illustration of platform 302 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, in some embodiments the actuation unit 310 may not include both outer element 312 and inner element 316. Rather, inner element 316 may be directly rotatably mounted to aerodynamic element 306.

Figure 6:
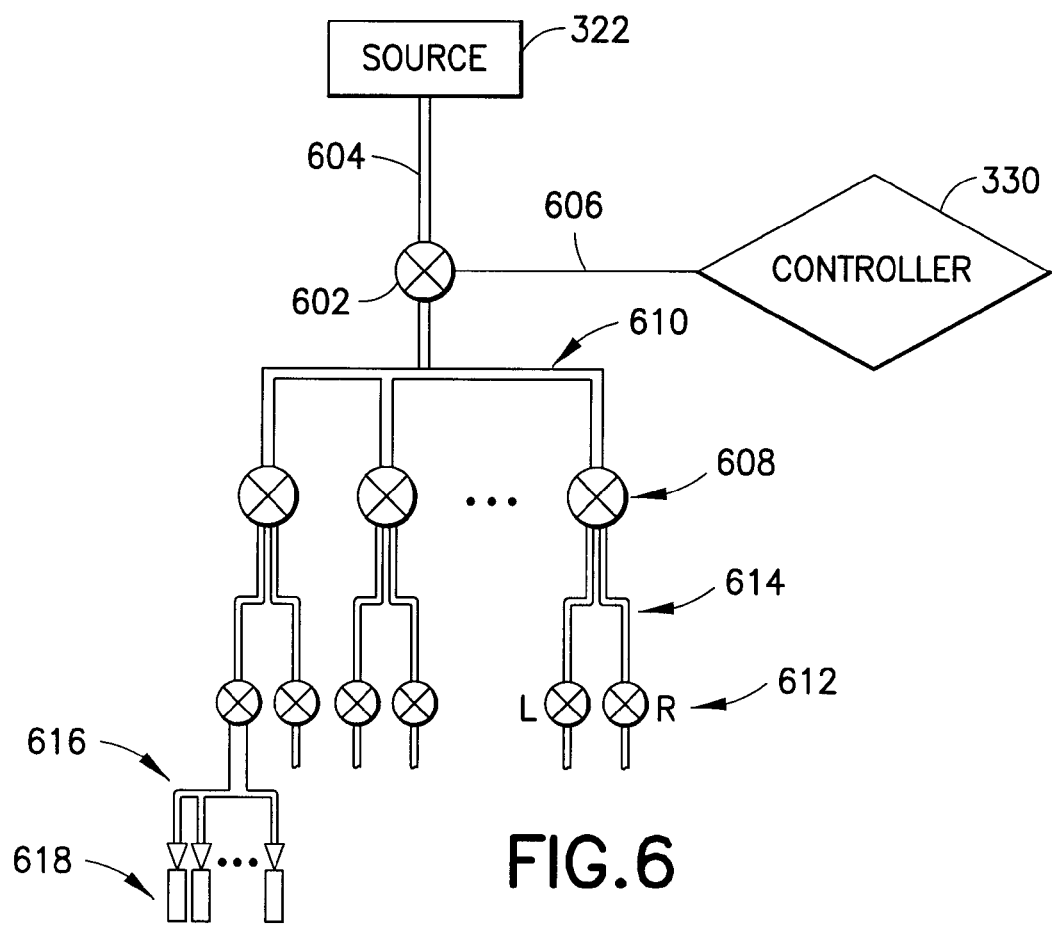
FIG. 6 is a flowchart showing the flow of air in accordance with a further embodiment having noise/vortex-reducing devices installed at a multiplicity of flap edges.

A flowchart of an airflow distribution system for general application is shown in FIG. 6. A fluidic source 322 (engine bleed, compressor) is used to provide the high-pressure input for operating the system. The source is connected to a main distribution valve 602 via a main duct 604. A controller 330 electrically activates the distribution valve 602 via electrical line 606 when the vortex/noise reduction system is required. The controller 330 can be activated by the pilot or it can be preprogrammed according to flight conditions. When the main distribution valve 602 is open, it distributes pressurized air to a set of aerodynamic element valves 608 via a manifold 610. Open valves 608 in turn supply pressurized air via internal ducts 614 to edge valves 612 disposed on the left (L) and right (R) edges of each aerodynamic element. Each edge valve 614, when open, allocates fluid in proper amounts to each of the traverse actuators 618 located in each flap edge region via a respective manifold 616. The fluid is discharged by the actuators 518 in the form of rapidly moving jets along each of the flap slots.

As previously discussed, producing an array of very small air jets which move rapidly in the chordwise direction can reduce flap noise. Each ejection slot may be of rectangular shape and have a certain aspect ratio (the long side is aligned with the flap chord). The periodic motion of the jets alters the tip vortex structure at its origin, reducing its intensity and thereby its noise footprint.

Another unique feature of this invention is the alleviation of trailing wakes. This has direct implications with regard to air traffic in airport environments, particularly with regard to requirements for minimum airplane separation distances. Analyses have shown that time-varying excitation is very effective in either reducing the vortex strength or in introducing disturbances that lead to vortex destabilization. For transport airplanes this enables shorter and safer separation distances which will alleviate airport congestion. Another application is for rotorcraft, where the actuation helps mitigate blade vortex Interactions, thereby enhancing maneuverability and reducing acoustic signature and operational hazard.

The implementations disclosed herein improve economics over current actuation systems. Compared with constant blowing, the traverse actuation system results in reduced input, and therefore, reduced fluidic requirements. This implies that the traverse actuators can be integrated with smaller engines, which translates to lower airplane weight, less degradation in engine performance and smaller space requirement. Also, the advantages realized from traverse actuation have direct implications with respect to fuel consumption and emissions.

While the invention has been described with reference to various embodiments, it will be understood by those skilled in the art that various changes may be made and equivalents may be substituted for elements thereof without departing from the scope of the invention. For example, helical slots having less than one full turn could be employed. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "aircraft" should be construed broadly to include the following: fixed-wing aircraft and rotorcraft; the term "aerodynamic element" should be construed broadly to include the following: flight control surfaces, airplane wings and winglets, and rotorcraft blades; and the term "side edge" should be construed broadly to include the following: side edges of flight control surfaces, tips of airplane wings and winglets, and tips of rotorcraft blades.

The invention claimed is:

1. A method of attenuating noise generated by an aerodynamic element during flight of a vehicle, comprising:
    (a) forming a slot on or near a side edge of an aerodynamic element having upper and lower surfaces, which slot will be generally aligned with a streamwise direction during flight;
    (b) ejecting air out of the slot in the form of an air jet which moves along at least a portion of the length of the slot in a streamwise direction for a distance that is greater than a width of the air jet; and
    (c) extinguishing the air jet when it reaches a termination point.

2. The method as recited in claim 1, wherein step (b) comprises rotating a cylinder having an interior duct and a helical slot in fluid communication with the interior duct.

3. The method as recited in claim 1, comprising repeating steps (b) and (c) such that a multiplicity of air jets traverse the slot in succession.

4. The method as recited in claim 1, wherein step (b) comprises rotating a cylinder having an interior duct and a multiplicity of openings in fluid communication with the interior duct, each opening of the multiplicity of openings being in fluid communication with the slot once per revolution of the rotating cylinder.

5. The method as recited in claim 1, comprising repeating steps (a), (b) and (c) for two different slots, one slot being located on one of the upper surface, lower surface and side edge, and a second slot being located on one of the upper surface, lower surface and side edge on which the first slot is not located.

6. The method as recited in claim 1, wherein step (b) comprises rotating a cylinder having an interior duct and a helical slot in fluid communication with the interior duct, the helical slot being in continuous fluid communication with the slot formed in the aerodynamic element during revolution of the rotating cylinder.

7. A method of attenuating noise generated by an aerodynamic element during flight of a vehicle, comprising:
    (a) forming a slot on or near a side edge of an aerodynamic element having upper and lower surfaces, which slot will be generally aligned with a streamwise direction during flight;
    (b) ejecting air out of the slot in the form of a plurality of successively initiated air jets which traverse respective portions of a length of the slot concurrently, each successively initiated air jet traversing a length of the slot in a streamwise direction during partially overlapping time intervals; and
    (c) extinguishing each air jet in succession when it reaches a termination point.

8. The method as recited in claim 7, wherein step (b) comprises rotating a cylinder having an interior duct and a plurality of helical slots in fluid communication with the interior duct, each helical slot being in continuous fluid communication with the slot formed in the aerodynamic element during revolution of the rotating cylinder.

9. A method of attenuating noise generated by an aerodynamic element during flight of a vehicle, comprising the following steps performed prior to flight:
    (a) forming a slot on or near a side edge of an aerodynamic element having upper and lower surfaces, which slot will be generally aligned with a streamwise direction during flight;
    (b) forming a cylinder having an interior duct and a multiplicity of slots or apertures in fluid communication with the interior duct; and
    (c) arranging the cylinder so that it is rotatable about its axis and so that each slot or aperture will be in fluid communication with the slot once during each revolution of the cylinder, and
comprising the following steps performed during flight:
    (d) supplying pressurized air to the interior duct of the cylinder; and
    (e) rotating the cylinder while pressurized air is being supplied,
wherein the slots or apertures are arranged so that air is intermittently ejected out of the slot during step (e) in the form of successive pluralities of concurrently initiated air jets.

* * * * *